US005520543A

United States Patent [19]

Mitui

[11] Patent Number: 5,520,543

[45] Date of Patent: May 28, 1996

[54] VISUAL ACUITY RECUPERATION TRAINING APPARATUS

[76] Inventor: Norio Mitui, 220-2, Oaza-Higashiminowa, Minowa-machi, Kamiina-gun, Nagano, Japan

[21] Appl. No.: 277,611

[22] Filed: Jul. 20, 1994

[30] Foreign Application Priority Data

Jul. 21, 1993 [JP] Japan ............................... 5-044339 U
Mar. 18, 1994 [JP] Japan ............................... 6-003782 U

[51] Int. Cl.$^6$ .................................................. G09B 19/00
[52] U.S. Cl. ............................ 434/236; 601/37; 434/237
[58] Field of Search .................................... 434/236–238; 351/200, 203; 601/37

[56] References Cited

U.S. PATENT DOCUMENTS 3,755,936 9/1973 Terre et al. ................................ 40/33
4,354,843 10/1982 Feldman ................................ 434/236

*Primary Examiner*—Richard J. Apley
*Assistant Examiner*—Glenn E. Richman
*Attorney, Agent, or Firm*—Dorn, McEachran, Jambor & Keating

[57] ABSTRACT

A visual acuity recuperation training apparatus comprising a plurality of small light emitting elements dispersed and arranged on a panel plane in the up and down, and left and right directions, and a light emitting elements control section configured so that it is possible to blink at least some of the small light emitting elements with the blinking pattern modes in which they are lit one after another with appointed patterns. And comprising a half mirror plate arranged roughly parallel to the front side of the arrangement plane of the small light emitting elements.

8 Claims, 10 Drawing Sheets

VISUAL ACUITY RECUPERATION TRAINING APPARATUS

BACKGROUND OF THE INVENTION

1. Field of the Invention

The present invention relates to a visual acuity recuperation training apparatus, and in particular relates to an apparatus which is used for training for the purpose of visual acuity recuperation by movements of light points and increase and/or decrease of light intensity.

2. Related Background Art

Conventionally, original training methods have been employed in hospitals, training centers etc in order to eliminate and recuperate visual acuity disorders such as myopia, hypermetropia, astigmatism, visual field constriction, etc. However, any decisive training method has not been established in order to recuperate visual acuity disorders yet.

As training methods for visual acuity disorders, there are principally a light and shade training method for training the irises, which are involuntary muscles, by changing the light intensity coming from outside and a direction and distance (far and near) training method for training the ciliary body and ocular movement muscles, which are voluntary muscles.

In the light and shade training method, the irises are opened and closed by opening and closing the eyes at an appointed interval and/or intercepting the visual field. In the direction and distance (far and near) training method, the eye is caused to focus at one point or a plurality of points, which are different one after another, in compliance with an appointed pattern with a plurality of points described on a panel etc.

Actually however, with the above training methods, as it is necessary for one to intercept the external light with one's own will or to focus on the points on the panel with one's own will, they require high concentration and strong will. There will be caused problems such as that it takes much time to obtain some good results of recuperation, and many of trainees give up the training in the meantime after the training is started because the training itself is very cumbersome.

SUMMARY OF THE INVENTION

The invention solves the above problems, and it is therefore an object thereof to provide an apparatus which does not require high concentration and strong will in the above visual acuity recuperation and with which the training itself is easy.

An apparatus according to the invention comprises a plurality of small light-emitting elements dispersed and arranged in all directions (up and down, left and right) on a panel plane and a light-emitting elements control section provided with a blinking pattern mode, which causes at least some of the small light-emitting elements to be lit one after another in compliance with an appointed pattern. With the apparatus, it is possible to simultaneously carry out the training of ocular movement muscles and ciliary body by causing a patient to stare at the movements of the small light-emitting elements which are lit.

In this case, a light and shade light-emitting element having a greater light-emitting area and more intensive light than the small light-emitting elements are arranged on a panel plane, a light and shade pattern mode which causes the light and shade light-emitting element to blink at an appointed length of time is provided at the light-emitting elements control section, and the light and shade light-emitting element is caused to blink by the light-emitting elements control section. Then, it is possible to train the irises.

Due to the light and shade light-emitting element being composed so that white dispersion light can be irradiated to the front side of the apparatus, it is possible to give enough light intensity to open and close the irises without leaving concentrated residual images on the retina.

Furthermore, in a case where the panel plane and small light-emitting elements on being turned off are composed to be of the same or similar color, the small light-emitting elements on being turned off will be indistinguishable and will not be conspicuous. To the contrary, the small light-emitting elements which are lit will be conspicuous, thereby causing a trainee to be more concentrated in the training.

A plurality of light-emitting elements dispersed and arranged roughly on a plane, a half mirror plate attached roughly in parallelism to the front side of the plane on which the small light-emitting elements are arranged, and a light-emitting elements control section which is provided with a blinking pattern mode with which at least some of the small light-emitting elements are lit one after another with an appointed pattern are provided. As the half mirror plate is provided as described above, the other background structure such as the small light-emitting elements which are not lit can not be seen while the light of the small light-emitting elements arranged at the back thereof is caused to be penetrated to the front side thereof. Therefore, only the small light-emitting elements which are lit can be seen, and it is possible to carry out the training in compliance with the blinking pattern mode, such as the direction and distance (far and near) training, without interrupting the concentration of a trainee. Furthermore, it is also possible to perform the training while examining the trainee's face, especially the eyeball, which exists forwards, with the half mirror plate.

Hereupon, a illuminating light is provided at the circumferential position forward of the half mirror plate, and a blinking pattern mode with which the illuminating light is caused to blink at an appointed interval is provided at the light-emitting elements control section. Therefore, it is possible to house the illuminating light therein without interrupting the thinning of the apparatus, and at the same time it is also possible to carry out the blinking light training by causing the illuminating light to blink. Furthermore, as part of the illuminating light, especially the light irradiated to the rear side (half mirror plate side) is reflected by the half mirror plate, the illuminating light can be efficiently utilized for the training. Namely, it can be attempted that, with the light intensity necessary for effective training secured, the power consumption of the illuminating light is suppressed, and the size thereof is reduced.

Furthermore, in a case where it is composed so that white dispersion light is irradiated from the illuminating light, it is possible to avoid any point of danger which may generate obstacles for eyes even though the pupils are opened. Simultaneously, it is possible to obtain the uniform light intensity.

Furthermore, in a case where the casing is formed so that it can cover at least the eyes of the face and a supporting member to hold the casing on the face is provided, it is possible to support the casing on the head with the supporting member. Therefore, the visual field will not be changed even though the face is moved. Therefore, as the eye ball movements are forced to be carried out only with the eye ball, it is possible to carry out the training efficiently.

DESCRIPTION OF THE PREFERRED EMBODIMENTS

Preferred embodiments of the invention will be described in detail with reference to the drawings attached herewith.

A first preferred embodiment

Figure 1:
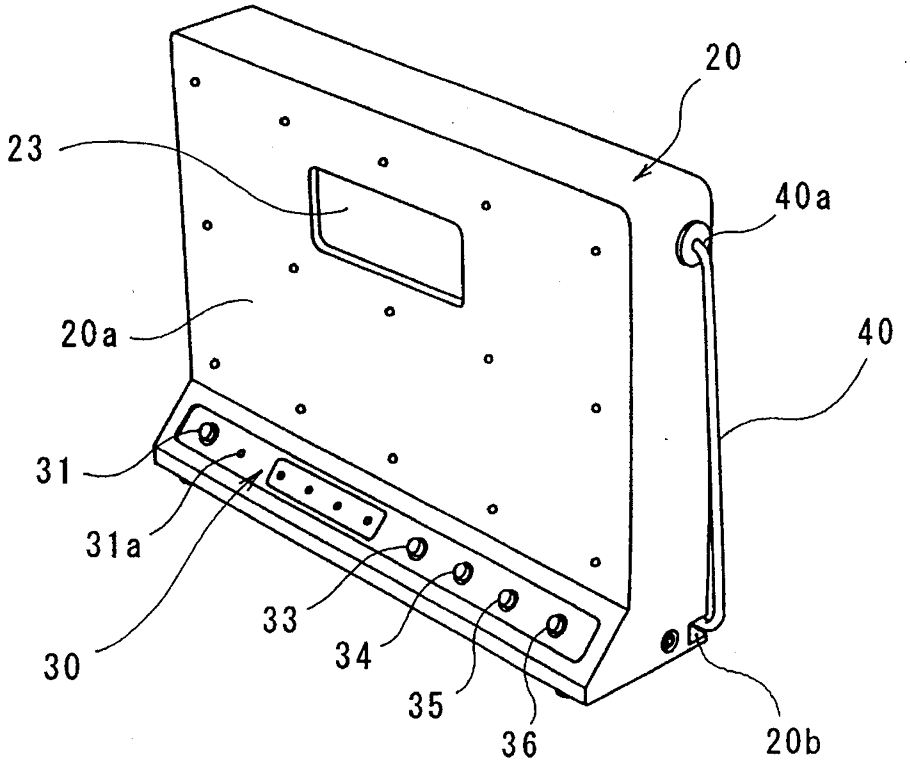
FIG. 1 is a perspective view showing the entire shape of a preferred embodiment of the invention.

As shown in FIG. 1, the first preferred embodiment according to the invention has a roughly rectangular plate-like body 20 and roughly comprises a panel plane 20*a* formed at the front side of the body 20, an operating section 30 arranged at the lower part of the plane face 20*a*, and a supporting frame 40 attached to the sides of the body 20.

Figure 2:
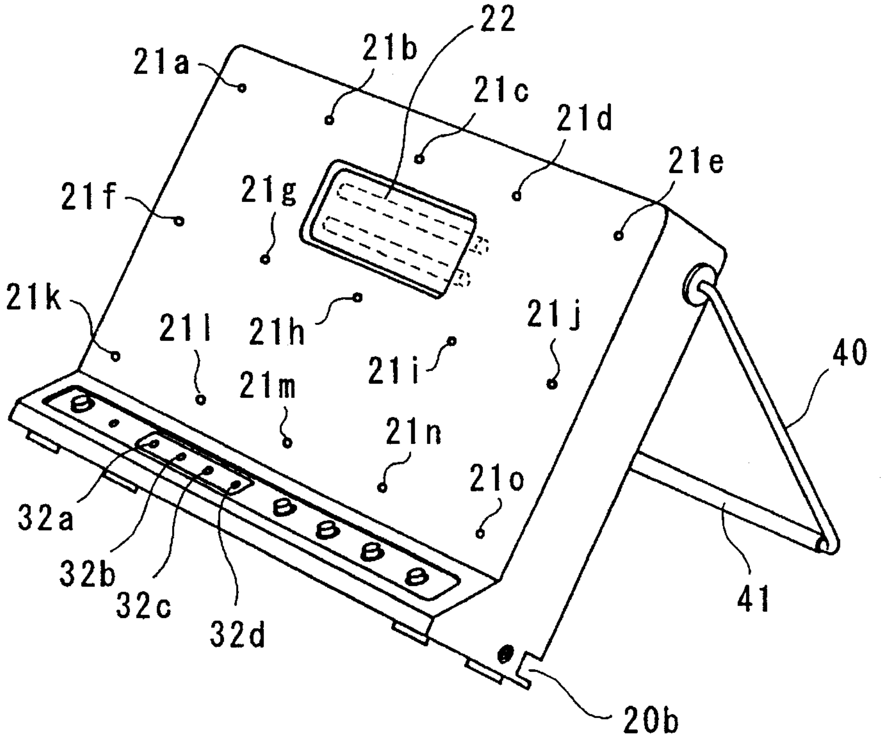
FIG. 2 is a perspective view showing that the above preferred embodiment is arranged in an inclined state.

A power source consisting of a battery, an alternate current/direct current converter etc, and control circuits which operate based on the power supplied from the power source are built in the body 20. The panel plane 20*a* is a rectangular plane, and as shown in FIG. 2, fifteen LEDs (light-emitting diodes) are arranged equidistantly in three lines of five rows on the plane. The entire body 20 is painted to be dark green, and the LEDs 21 are composed so that their existence is not distinguished while they are off because they become light green when they are turned off. A small fluorescent lamp consisting of two parallel discharge tubes is arranged slightly upwards of the center of the body 20. Furthermore, a white resin made dispersion plate 23 (white light splashing plate) having a light penetration property is attached to the front side thereof. At the operating section 30, various kinds of push button switches 31, 33, 34, 35, 36 and display LEDs 31*a*, 32*a*, 32*b*, 32*c*, 32*d* are installed at the inclined section projecting front downwards from the panel plane 20*a*.

The supporting frame 40 is a channel-like metallic bar of which both ends 40*a* are fitted in the upper part of both the sides of the body 20. The supporting frame 40 is rotatably attached thereto centering around both ends 40*a*. As shown in FIG. 2, the middle horizontal part of the supporting frame 40 is provided with a tubular slip stopper 41 made of elastic rubber. When the apparatus is stored, the supporting frame 40 is accommodated in the accommodation groove 20*b* secured at the lower part of the rear side of the body 20 as shown in FIG. 1. When the apparatus is used, the supporting frame will be a supporting leg in a case where the body 20 is inclined and installed for example as shown in FIG. 2. Furthermore, the supporting frame 40 is able to be hung on a hook etc attached to the wall while being turned upwards.

Figure 3:
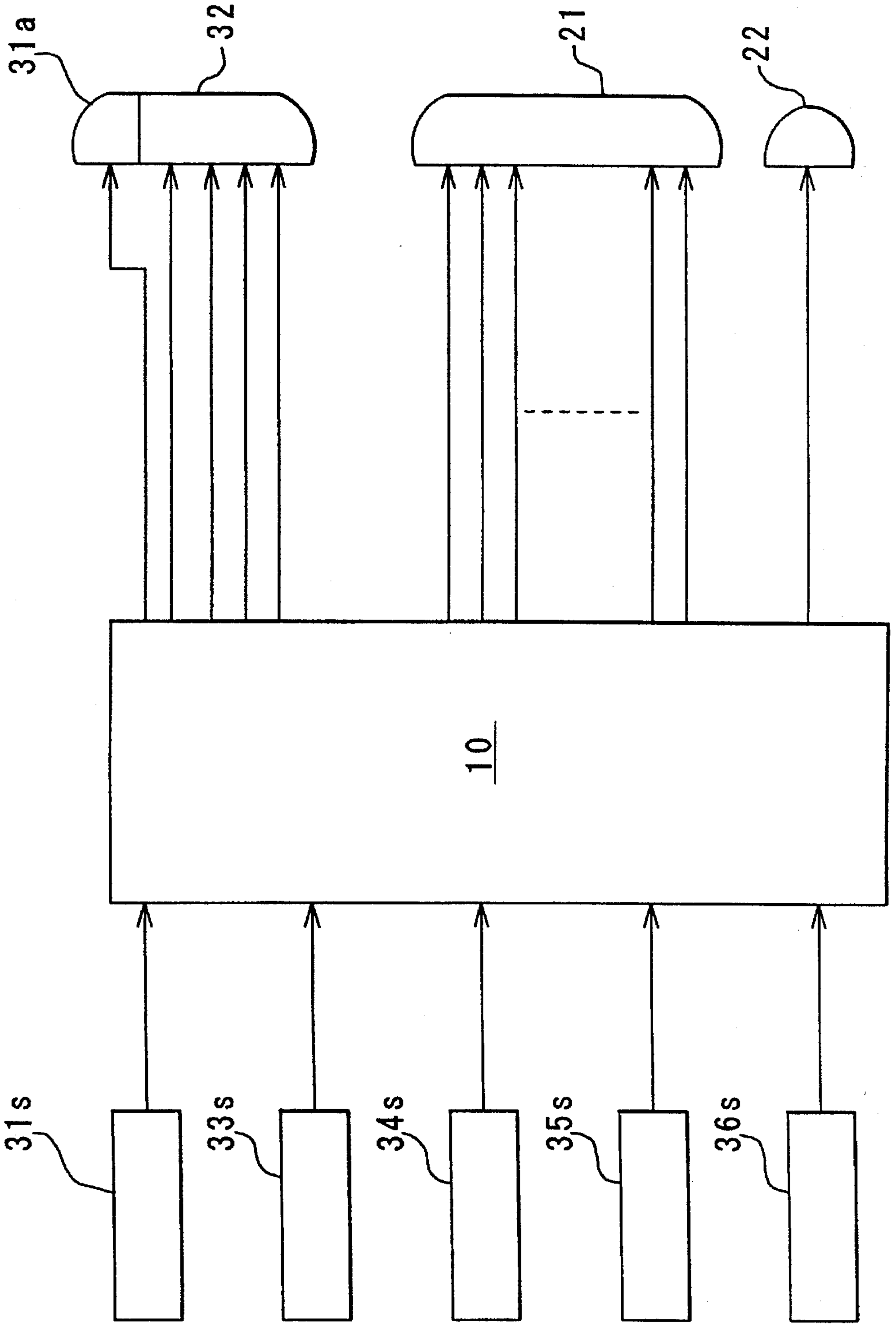
FIG. 3 is a block diagram showing the configuration of a control section in the preferred embodiment.

The operating push button 30 is connected to the power source switch 31 to supply the power of the apparatus to the control circuits 10, lamps, etc shown in FIG. 3, and the LED 31*a* is lit when the power is turned on. The LED 32*a* is lit while the LEDs 21 on the panel plane 20*a* are being driven with the first blinking pattern described later, LED 32*b* is lit with the second blinking pattern as well, the LED 32*c* is lit while the fluorescent lamp 22 is being driven with the light and shade pattern described later, and the LED 32*d* is composed so that it is lit at an appointed interval when the pattern is finished.

The operating push button 33 is connected to the start switch 33*s* to commence the blinking pattern, the operating push button 34 is connected to the repeating switch 34*s* to commence the first blinking pattern after the second blinking pattern is finished, the operating push button 35 is connected to the lamp switch 35*s* to commence the light and shade pattern, and the operating switch 36 is connected to the stop switch 36*s* which discontinues the light and shade pattern and terminates the blinking pattern.

The control circuits shown in FIG. 3 are those to drive the LEDs 21 and fluorescent lamp 22 with an appointed pattern in compliance with the operations of the operating push buttons 31, 33, 34, 35, and 36. These control circuits may be comprised of an MPU (microprocessor unit) in which programs corresponding to the flow charts shown in FIG. 4 are incorporated, a programmable controller and a sequencer or various kinds of logic circuits.

Figure 4:
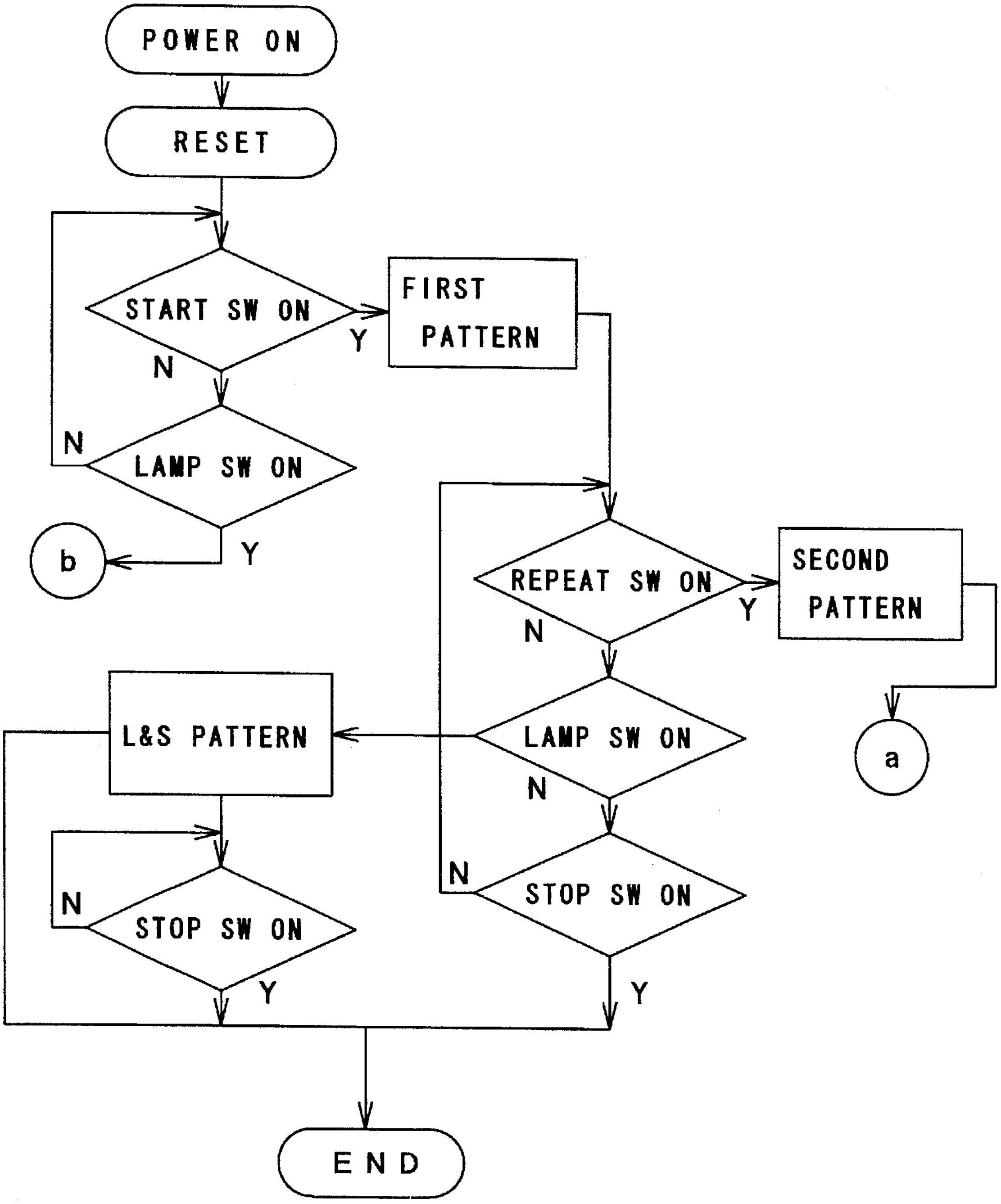
FIG. 4 is a flow chart showing the functions of the control section in the preferred embodiment.
Figure 5:
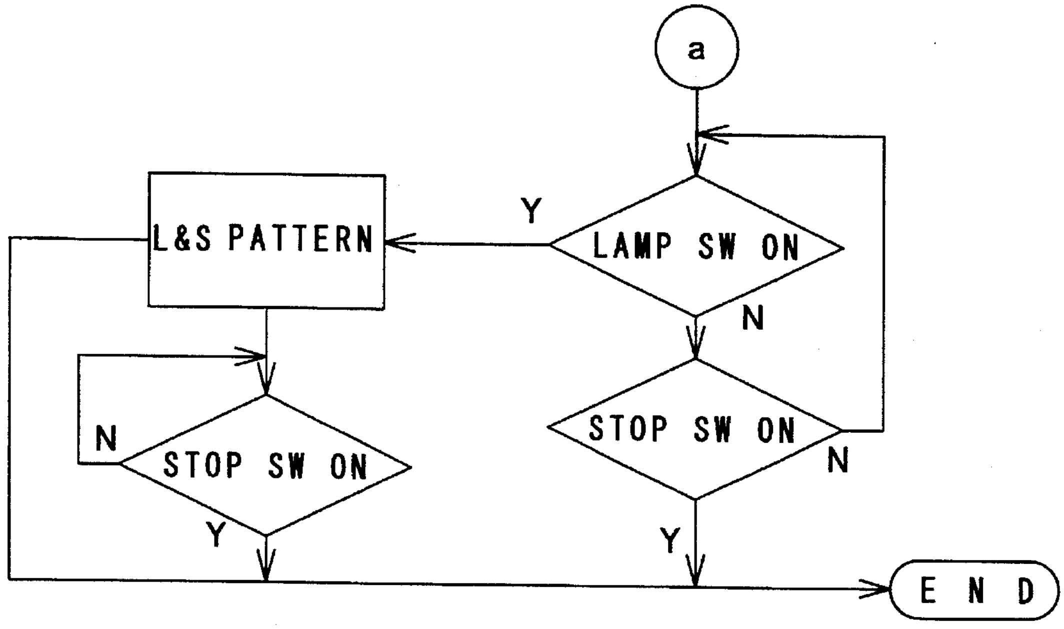
FIG. 5 is a flow chart showing the functions of the control section in the preferred embodiment.
Figure 6:
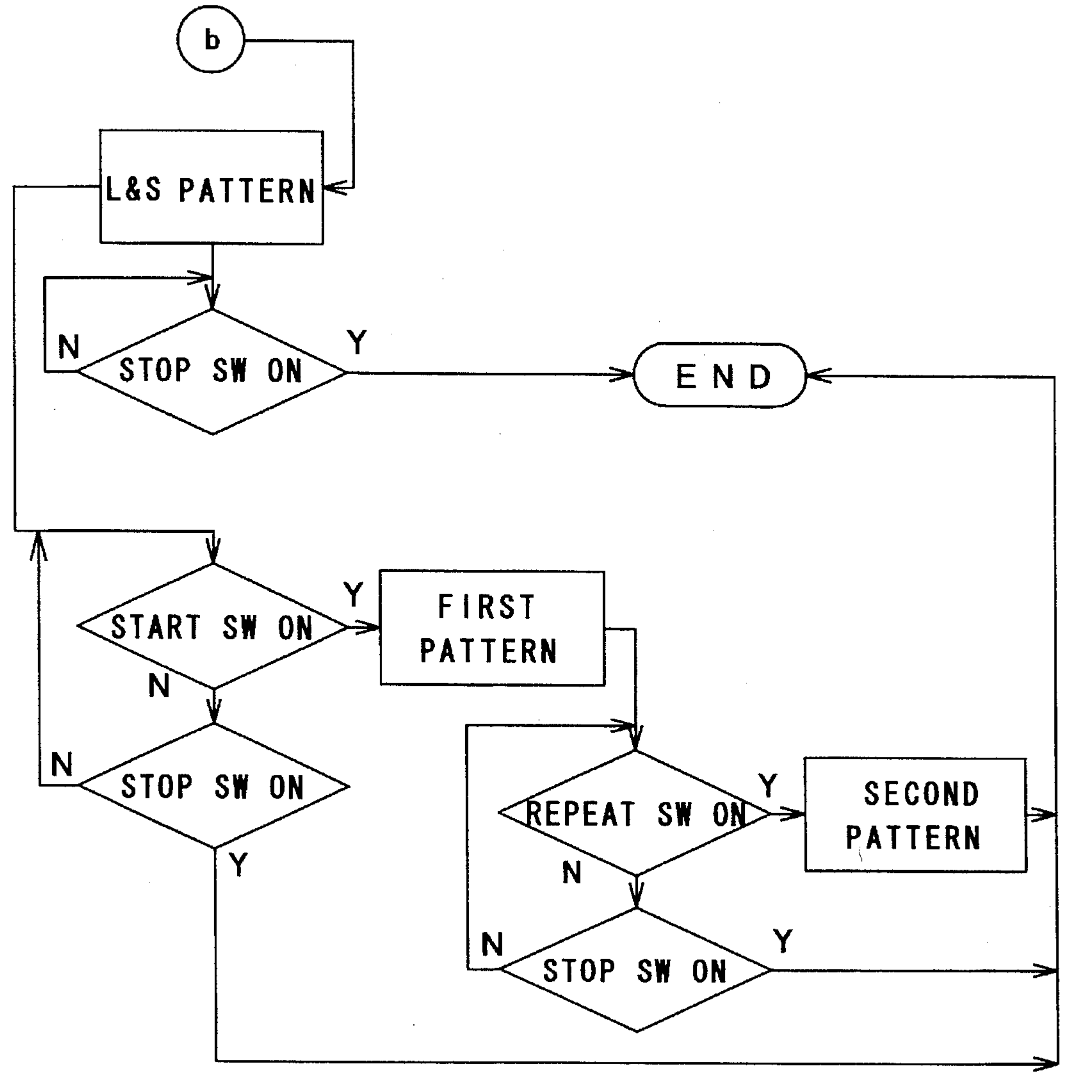
FIG. 6 is a flow chart showing the functions of the control section in the preferred embodiment.

Referring to FIG. 4, FIG. 5, and FIG. 6, the actions of the preferred embodiment will be described. As the power switch 31*s* is closed by pressing the operating push button 31, the system is reset (initialized), and simultaneously the display LED 31*a* is lit. As three consecutive sounds (beep, beep, beep) are issued from a sounding device (not illustrated) to inform of preparation finish, the start switch 33*s* and lamp switch 35*s* stand by for input. In this state, as the operating push button 33 is pressed, the start switch 35*s* is closed, and the first blinking pattern (described later) is commenced together with the sounding of a single sound (beep). Hereinafter, a single sound is issued whenever the respective patterns are commenced and at every step progress during the patterns. Furthermore, four consecutive sounds (beep, beep, beep, beep) are issued when they are finished. As the first blinking pattern is finished, the repeat switch 34*s*, lamp switch 35*s* and stop switch 36*s* stand by for input. As the lamp switch 35*s* is closed by pressing the operating push button 35, the light and shade pattern (described later) is commenced, and the program is completed by the finish of the pattern or the closing of the stop switch 36*s*. As the repeat switch 34*s* is closed by pressing the operating push button 34, the second blinking pattern (described later) is commenced. As the pattern is finished, the lamp switch 35*s* and stop switch 36*s* stand by for input.

In this state, as the lamp switch 35*s* is closed by the pressing of the operating push button 35, the light and shade pattern (described later) is commenced. The program is completed when the pattern is finished. When the stop switch 36*s* is closed by the pressing of the operating push button 36, the program is completed.

As the lamp switch 35*s* is closed after the system reset shown in FIG. 4, the light and shade pattern is commenced immediately thereafter as shown in FIG. 6, and as the pattern is finished, the start switch 33*s* and stop switch 36*s* stand by for input. At this time, the program will be completed when the stop switch 36*s* is closed. Then, as the start switch 33*s* is closed, the first blinking pattern is commenced. After the termination of the first blinking pattern, the repeat switch 34*s* and stop switch 36*s* stand by for input. At this time, the repeat switch 34*s* is closed to cause the second blinking pattern to be commenced. As the stop switch 36*s* is closed, the program will be completed.

The above first and second blinking patterns refer to the blinking pattern of fifteen LEDs 21 (21*a*, 21*b*, . . . 21*n*, and 21*o* ). In these blinking patterns, one step consists of, for example, one cycle of four seconds. At every step, the LEDs to be lit are changed one after another as shown in the Table below: In the Table below, for example, the LED 21*a* is represented as "a".

[First blinking pattern]

| | | | | | | | | | | | |
|---|---|---|---|---|---|---|---|---|---|---|---|
| Step sequence | 1 | 2 | 3 | 4 | 5 | 6 | 7 | 8 | ... | 24 | 25 | 26 |
| LED No. | a | a | off | c | a | off | e | b | ... | off | o | 1 |
| LED No. | off | d | off | off | e | off | off | e | ... | off | off | o |

The above blinking pattern consists of a step where the LEDs are lit independently, a step where a pair of LEDs mutually apart therefrom are lit and a step where all the LEDs are turned off.

[Second blinking pattern]

| | | | | | | | | | | | | |
|---|---|---|---|---|---|---|---|---|---|---|---|---|
| Step sequence | 1 | 2 | 3 | 4 | 5 | 6 | 7 | 8 | 9 | ... | 17 | 18 |
| LED No. | a | b | c | d | e | off | f | g | h | ... | o | off |
| LED No. | off | ................................ | | | | | | | | | | |
| Step sequence | 19 | 20 | 21 | 22 | 23 | 24 | 25 | ... | 32 | 33 | | |
| LED No. | a | b | c | d | off | f | g | ... | n | off | | |
| LED No. | b | c | d | e | off | g | h | ... | o | off | | |
| Step sequence | 34 | 35 | 36 | 37 | 38 | ... | 45 | 46 | | | | |
| LED No. | a | b | c | off | f | ... | m | off | | | | |
| LED No. | c | d | e | off | h | ... | o | off | | | | |
| Step sequence | 47 | 48 | 49 | 50 | ... | 54 | 55 | 56 | 57 | 58 | 59 | 60 |
| LED No. | a | b | off | f | ... | 1 | off | a | f | j | k | o |
| LED No. | d | e | off | i | ... | o | off | e | off | off | off | off |

In these patterns, LEDs are individually lit one after another in steps 1 through 17, two adjacent LEDs are lit in steps 19 through 32, and two LEDs at both sides are lit with one LED skipped, in steps 34 through 45.

Furthermore, in the light and shade pattern, the fluorescent lamp 22 are turned on and off alternately on interval of four seconds per step. And, the ON step and OFF step are carried out ten times, respectively.

Next, the method of use and actions of the above preferred embodiment will be described. For example, in a case where the apparatus is placed on a table or desk for use, the supporting frame 40 is turned to an appointed degree of angle to be taken out from the accommodation groove 1*a* to cause the body 1 to be inclined rearwards. Then, the apparatus is positioned so that the trainee's eyes are orthogonal to the panel plane 2 at the central portion of the panel plane 2. In a case where the apparatus is used with the trainee standing, the supporting frame 4 is rotated upwards of the body 1 and the attaching part of the tubular slip stopper 41 is caught at hooks attached to the wall to cause the eyes in the horizontal direction to come to the central portion of the panel plane 2. It is preferable that the distance between the eyes and the panel plane 2 is 5 to 15 centimeters, and it is more preferable that at the beginning of the training the trainee's face is apart from the panel plane and is drawn near to the panel plane to secure the momentum as the training progresses.

While the first or second blinking pattern is being executed (hereinafter merely called "blinking pattern mode"), the trainee is designed to stare at the lighting LEDs with only the movements of eyes without moving the face as much as possible, and in a case where a plurality of LEDs are lit, the trainee is designed to stare at all the LEDs as uniformly as possible.

In the blinking pattern mode, the eye balls are moved by staring at different LEDs which are lit one after another. Thereby it is possible to carry out the direction training, that is, to train the ocular movement muscles. Furthermore, the focal point adjusting performance is activated by staring at the lighting condition (ultra short distance point) of one LED, the lighting condition (short distance point) of two adjacent LEDs, the lighting condition (medium distance point) of two LEDs at both sides with one OFF LED put therebetween, the lighting condition (long distance point) of two LEDs at both sides with two OFF adjacent LEDs put therebetween, and the lighting conditions (ultra long distance point) of two LEDs at both sides with three OFF adjacent LEDs put therebetween. Thereby, it is possible to carry out the far and near training, that is, to train the ciliary body. In all training, all the trainee has to do is to stare at the lit LEDs. Therefore, it is not necessary for the trainee to look in appointed directions with his own will and to adjust the focal point. Thus, the training can be easily performed. Especially, as the panel plane 2 is made to be of the same color as that of the LEDs 21 when being turned off, there is no need to mind any LED that is turned off.

While the light and shade pattern is being executed (hereinafter merely called "light and shade mode"), it is preferable that the eyes are closed with the distance between the eyes and the panel plane set to 10 to 20 centimeters or the eyes are opened with the distance therebetween set to 30 to 40 centimeters.

In the light and shade mode, as the irises are closed according to the lighting of the fluorescent lamp 22 and are opened according to the turning-off thereof, it is possible to carry out the light and shade training, that is, to train the irises which are involuntary muscles. In this case, as there is no need to turn on and off an electric bulb or to cover up the eyes with hands, it is easy to perform the light and shade training.

A second preferred embodiment

Figure 11:
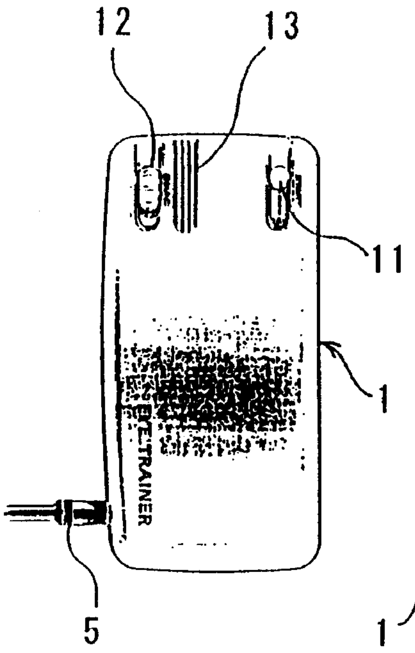
FIG. 11 is a rear view showing the appearance of the preferred embodiment.
Figure 12:
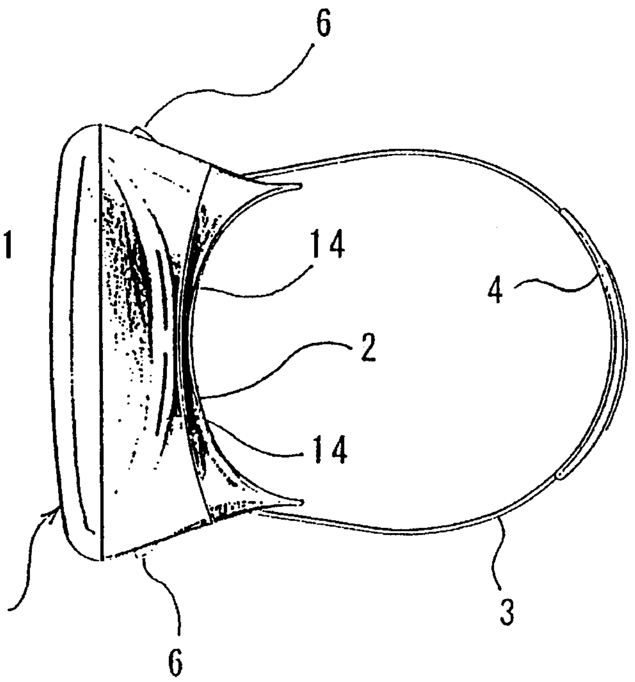
FIG. 12 is a plane view showing the appearance of the preferred embodiment.
Figure 13:
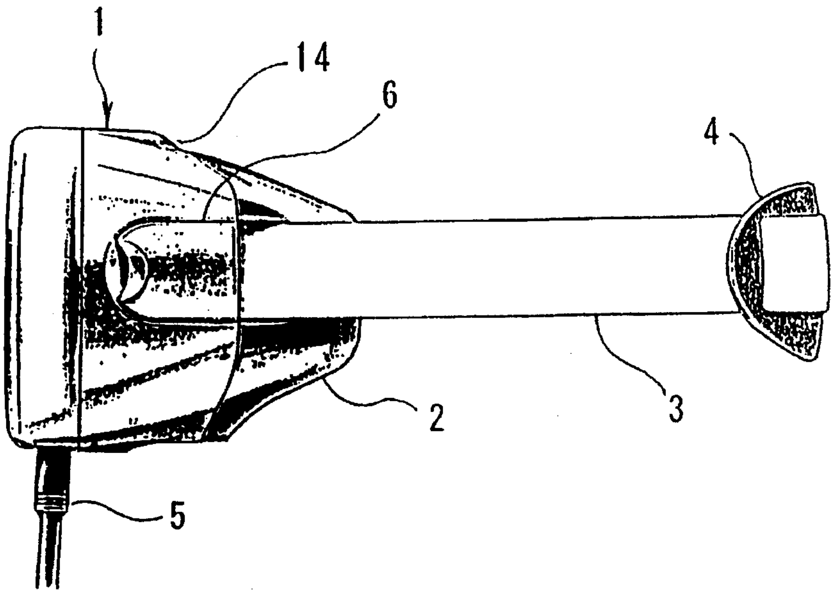
FIG. 13 is an enlarged side view showing the appearance of the preferred embodiment.

Next, the second preferred embodiment according to the invention will be described. The preferred embodiment, as shown in FIG. 11, FIG. 12 and FIG. 13, roughly comprises a hard resin made casing body 1, a soft resin or rubber made mask 2 attached to the opening side of the casing body 1, a supporting band 3 of which both ends are connected to the left and right sides of the casing body 1, a pad 4 attached to the supporting band 3 and a power source connector 5 connected to the lower part of the casing body 1. A start switch 11, sound switch 12 and an opening 13 for a speaker are formed at the rear side of the casing body 1. Air inlets 14, 14 are formed at the upper part of the casing body 1. Engaging members 6,6 to fix the end portions of the supporting band 3 are provided at the sides of the casing body 1.

Figure 9:
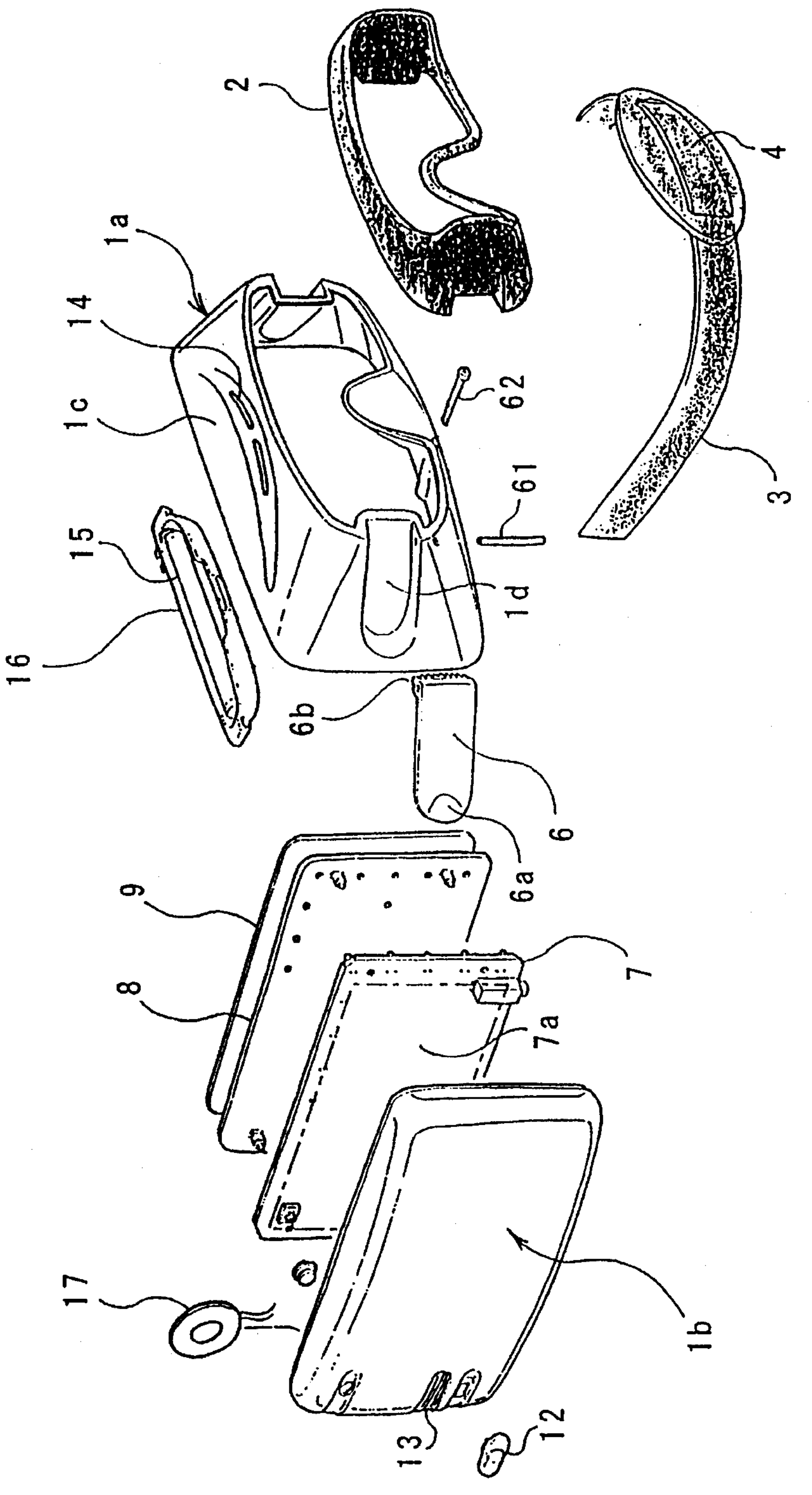
FIG. 9 is a disassembled perspective view showing the entire configuration of the preferred embodiment.

FIG. 9 is a disassembled view showing the preferred embodiment. The casing body 1 consists of a front casing 1*a* and a rear casing 1*b*. The front casing 1*a* is a cylindrical body having an opening like glasses, and the rear casing 1*b* is like a rectangular plate. A circuit substrate 7, supporting plate 8 and half mirror 9 are accommodated in this order from the rear side between the front casing 1*a* and the rear casing 1*b*. The circuit substrate 7 incorporates a control circuit 7*a* to carry out sequence movements necessary for the preferred embodiment. The control circuit 7*a* is connected to the start switch 11 and sound switch 12, which are arranged on the rear casing 1*b*, and to the speaker 17. Furthermore, the control circuit 7*a* is also connected to a number of LEDs placed in the supporting holes thereof cut open on the supporting plate 8.

The half mirror plate 9 is composed so that it penetrates at least a part of the light of the LED 18 at the rear side in the front direction, and at the same time reflects at least a part of the light (visible radiation) coming from the front side back to the front side. The half mirror plate 9 may be formed by coating (depositing) a metallic film such as aluminium to the front side surface of an acrylate resin made light penetration plate. The wall of the front side casing 1*a* is entirely inclined inwardly toward the front side, and the upper side thereof is provided with a portion 1*c* swelled upwards from the surrounding inclined plane. Then, an incandescent lamp 15 housed in a transparent lamp case 16 is arranged inside the swelled portion 1*c*.

Figure 10:
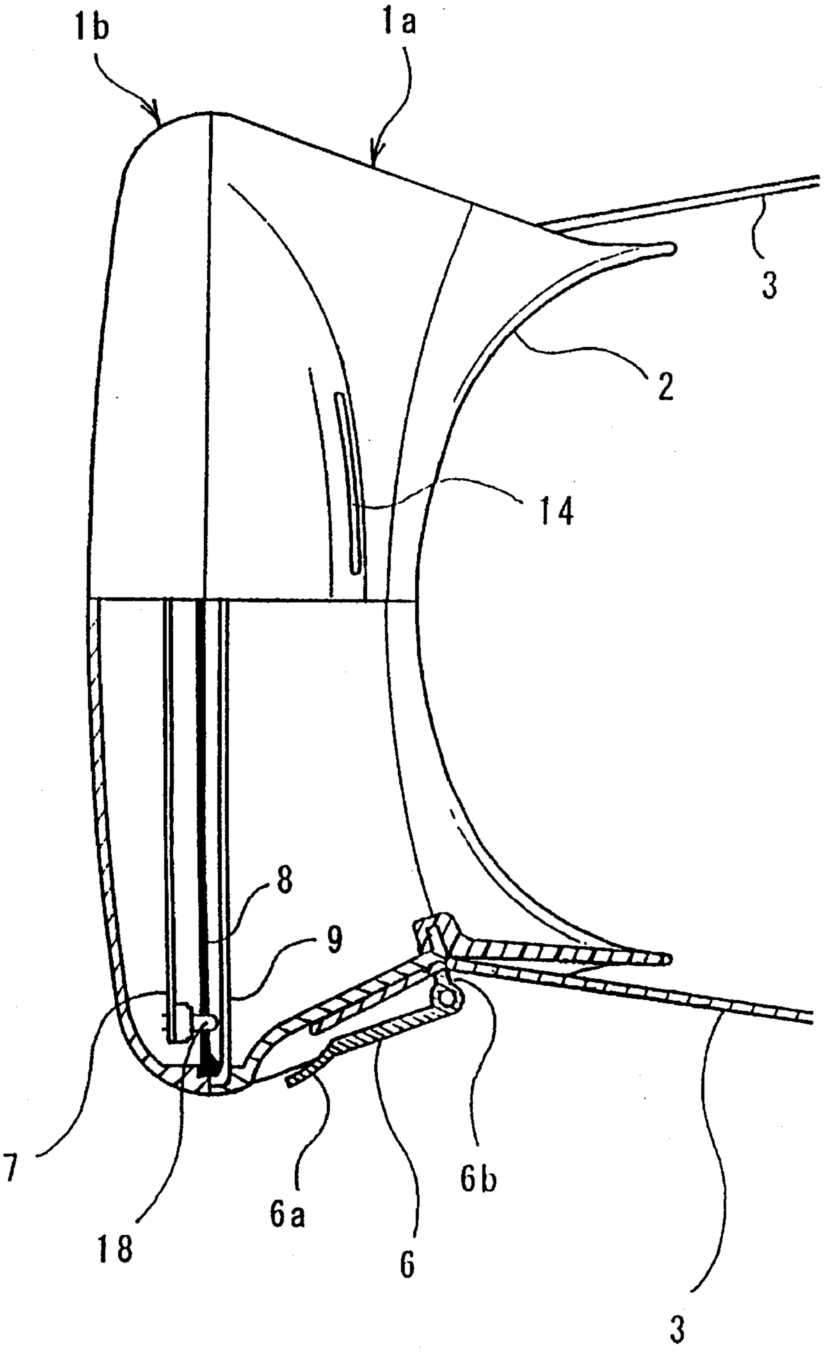
FIG. 10 is an enlarged plane view showing the configuration of the preferred embodiment with a part thereof shown in section.

Concave portions 1*d*, 1*d* are formed at both the left and right sides of the front casing 1*a*, and the engaging member 6 is rotatably attached in the concave portion 1*d* by an axis 61. The front casing 1*a* and rear casing 1*b* are connected to each other with a bolt 62. Furthermore, as shown in FIG. 10, a mask 2 is fitted in the front side of the front casing 1*a*. And with the operating portion 6*a* of the engaging member 6 drawn out from the concave portion 1*d*, both ends of the supporting band 3 are inserted in the concave portions 1*d* from the front side, and the operating portion 6*a* is pushed in the concave portion 1*d* again. Then, the engaging end 6*b* is caught in the supporting band 3, thereby causing the supporting band 3 to be fixed in relation to the casing body.

Figure 7:
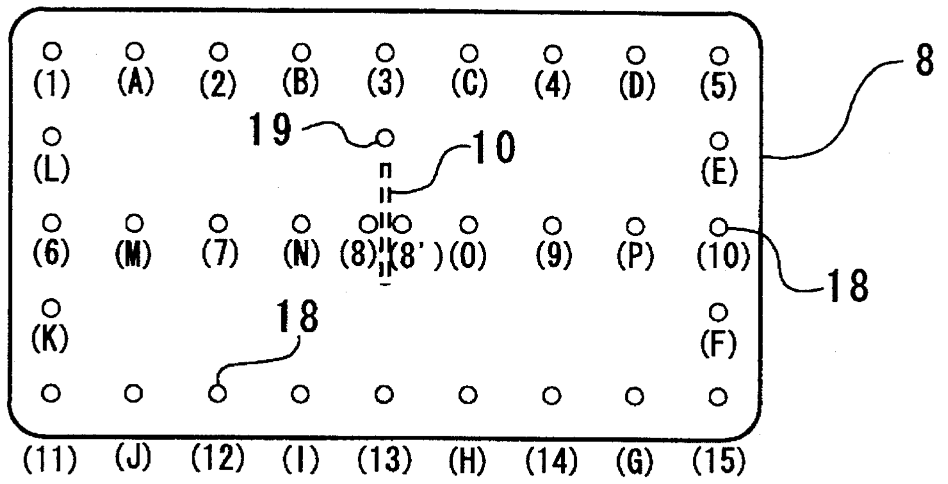
FIG. 7 is a front elevational view showing the array of LEDs in the preferred embodiment of a visual acuity recuperation apparatus according to the invention.

As shown in FIG. 7, the LEDs 18 are dispersed and arranged on and along the supporting plate 8. The mounting positions of the LEDs 18 are divided into an upper stage, middle stage and lower stage. On the upper stage, five LEDs (1), (2), (3), (4) and (5) and four LEDs (A), (B), (C), and (D) which are placed therebetween are provided from the left side thereof. On the middle stage, six LEDs (6), (7), (8), (8'), (9) and (10) and four LEDs (M), (N), (O) and (P) which are arranged therebetween are provided. Furthermore, an LED (L) is provided between the LEDs (1) and (6), and an LED (E) is provided between the LEDs (5) and (10), On the lower stage, five LEDs (11), (12), (13), (14) and (15) and four LEDs (J), (I), (H) and (G) which are attached therebetween are provided. Furthermore, an LED (K) is arranged between the LEDs (6) and (11), and an LED (F) is provided between the LEDs (10) and (15).

These LEDs 18 are composed so that they can be lit according to the predetermined pattern modes by the control circuit 7*a*. Here, the LEDs (8) and (8') which are arranged at the central position are composed so that they can blink simultaneously. All these LEDs 18 are lit to be green. A red-lighting LED 19 is attached to a little higher position from the center of the supporting plate 8. The LED 19 is lit in a case where the power is supplied as described later and the program of the control circuit 7*a* is not operated, thereby informing a trainee of the state where the program can be started to perform the visual acuity training described later.

The blinking pattern mode of the LEDs 18 is for carrying out the direction training and far/near training of the eye balls. One of the examples thereof is shown below. In the following description, the numbers and capital letters in the respective steps indicate the numbers of the lighting LEDs in FIG. 7.

[Blinking pattern mode 1]

| | | | | | | | | | | |
|---|---|---|---|---|---|---|---|---|---|---|---|
| Step sequence | 1 | 2 | 3 | 4 | 5 | 6 | 7 | 8 | 9 | 10 | 11 |
| LED No. | 3 | C | 4 | D | 5 | E | 10 | F | 15 | G | 14 |
| Step sequence | 12 | 13 | 14 | 15 | 16 | 17 | 18 | 19 | 20 | 21 | 22 |
| LED No. | H | 13 | I | 12 | J | 11 | K | 6 | L | 1 | A |
| Step sequence | 23 | 24 | 25 | 26 | 27 | 28 | 29 | 30 | 31 | 32 | 33 |
| LED No. | 2 | B | 3 | B | 2 | A | 1 | L | 6 | K | 11 |
| Step sequence | 34 | 35 | 36 | 37 | 38 | 39 | 40 | 41 | 42 | 43 | 44 |
| LED No. | J | 12 | 1 | 13 | H | 14 | G | 15 | F | 10 | E |
| Step sequence | 45 | 46 | 47 | 48 | 49 | | | | | | |
| LED No. | 5 | D | 4 | C | 3 | | | | | | |

This mode 1 is used for the direction training of eye balls, and the LEDs 18 are lit one after another. The lighting time of the respective LEDs is two seconds. The lighting sequence is as follows: The LEDs are composed so that the point of sight is turned counterclockwise after it is turned clockwise.

[Blinking pattern mode 2]

| | | | | | | | | | | | |
|---|---|---|---|---|---|---|---|---|---|---|---|
| Step sequence | 1 | 2 | 3 | 4 | 5 | 6 | 7 | 8 | 9 | 10 | 11 |
| LED No. | 8 | N | 7 | M | 6 | 8 | N | 7 | M | 6 | 8 |
| LED No. | 8' | O | 9 | P | 10 | 8' | O | 9 | P | 10 | 8' |
| Step sequence | 12 | 13 | 14 | 15 | | | | | | | |
| LED No. | N | 7 | M | 6 | | | | | | | |
| LED No. | O | 9 | P | 10 | | | | | | | |

The mode 2 is used for the far and near training of eye balls or independent movement training of left and right eye balls (so-called "walleye"). In this case, the LEDs 18 are lit two by two in turn. The lighting time of the respective LEDs 18 is two seconds. The lighting sequence is as follows: The distance between the left and right points of view is moved gradually in the left and right direction. Here, a pair of LEDs 8, 8' are provided at the center as shown in FIG. 7, so that it is easy for the left and right eye balls to be moved.

Figure 8:
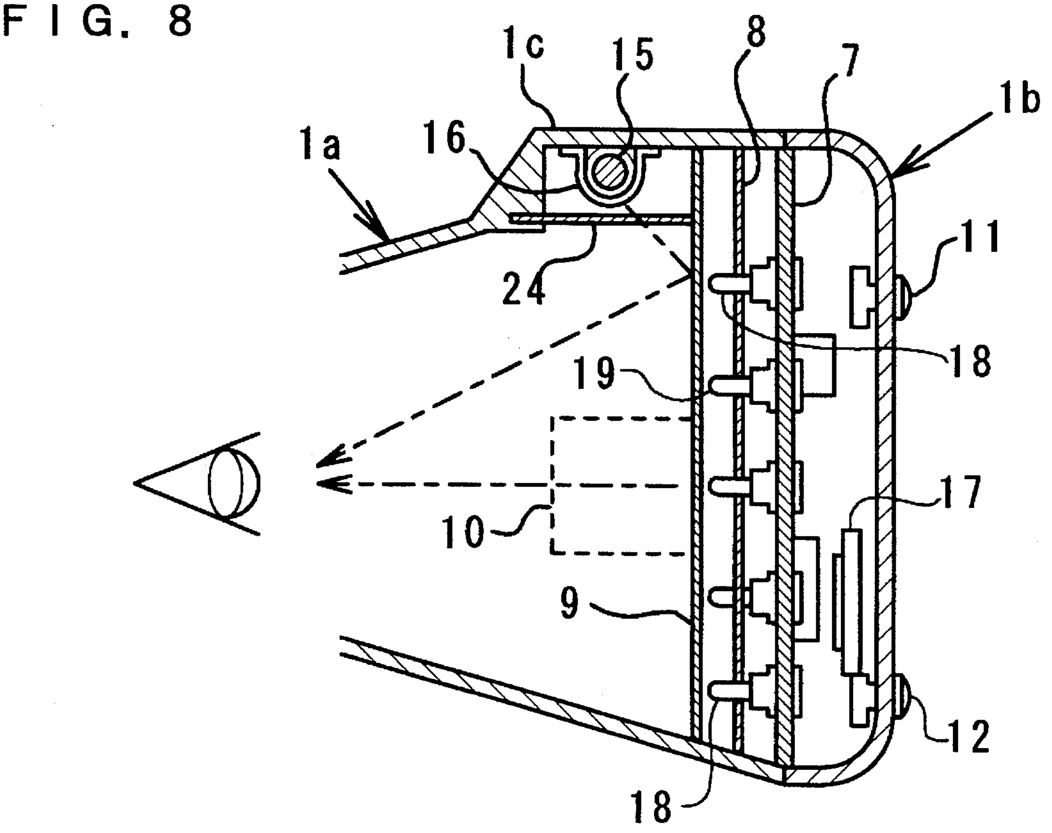
FIG. 8 is an enlarged longitudinal sectional view showing major parts of the preferred embodiment.

In this case, as shown with the dashed lines in FIG. 7 and FIG. 8, a partition plate 10 may be provided between the LED 8 and LED 8'. The partition plate 10 is to visually check the lighting LEDs at the left and right sides with the respective left and right eye balls. The partition plate 10 is provided forwards of the half mirror plate 9. As regards the left and right position of the partition plate, it is necessary to position the partition plate 10 at the center between the left and right eye balls. However, as regards the forward and rearward position of the partition plate 10, it may be positioned at any location from the position just on the half mirror plate 9 to the position just before the left and right eye balls. In a case where the partition plate 10 is positioned on the half mirror plate 9, the LEDs positioned at the center in the vicinity of the partition plate 10 are caused to be unable to be visually recognized from the left or right opposite eye ball, thereby causing a trainee to visually recognize two mutually drawn near LEDs separately with both the left and right eyes. Contrarily, in a case where the partition plate 10 is positioned right before the left and right eyes, although two mutually drawn near LEDs can be seen with both the left and just eyes, a trainee attempts to look at two LEDs much separated from each other separately with both the left and right eyes. As a matter of course, in a case where the partition plate extending from the position right on the half mirror plate 9 to the position right before the left and right eyes is used, a trainee is caused to visually recognize all the LEDs separately with both the left and right eyes.

[Blinking pattern mode 3]

The mode 3 is used for the far and near training and direction training of eye balls. One or two LEDs 18 is (are) lit simultaneously. The lighting time of the respective LEDs is three seconds. The lighting sequence is as follows: The mode 3 is for the far and near training together with the movements of the eye balls by simultaneously lighting the respective pairs of LEDs of different distance therebetween while moving the point of sight in the up and down and/or left and right directions. The lighting of a pair of approached LEDs establishes a state where a trainee looks at a short distance object, and the lighting of a pair of separated LEDs establishes a state where a trainee looks at a long distance object.

| | | | | | | | | | | | |
|---|---|---|---|---|---|---|---|---|---|---|---|
| Step sequence | 1 | 2 | 3 | 4 | 5 | 6 | 7 | 8 | 9 | 10 | 11 |
| LED No. | 1 | 3 | 5 | 1 | 1 | 2 | 2 | 3 | 3 | 4 | 2 |
| LED No. | off | off | off | off | 5 | off | 4 | off | 5 | off | 4 |
| Step sequence | 12 | 13 | 14 | 15 | 16 | 17 | 18 | 19 | 20 | 21 | 22 |
| LED No. | 5 | 3 | 1 | 1 | 2 | 2 | 1 | 4 | 1 | 5 | 2 |
| LED No. | off | 5 | off | 4 | off | 5 | 3 | off | 4 | off | 5 |
| Step sequence | 23 | 24 | 25 | 26 | | | | | | | |
| LED No. | 1 | 1 | 3 | 1 | | | The steps are on | | | | |
| LED No. | off | 5 | off | 5 | | | the upper stage. | | | | |
| Step sequence | 27 | 28 | 29 | 30 | 31 | 32 | 33 | 34 | 35 | 36 | 37 |
| LED No. | 6 | 8 | 10 | 6 | 6 | 7 | 7 | 8 | 8 | 9 | 7 |
| LED No. | off | off | off | off | 10 | off | 9 | off | 10 | off | 9 |
| Step sequence | 38 | 39 | 40 | 41 | 42 | 43 | 44 | 45 | 46 | 47 | 48 |
| LED No. | 10 | 8 | 6 | 6 | 7 | 7 | 6 | 9 | 6 | 10 | 7 |
| LED No. | off | 10 | off | 9 | off | 10 | 8 | off | 9 | off | 10 |
| Step sequence | 49 | 50 | 51 | 52 | | | | | | | |
| LED No. | 6 | 6 | 8 | 6 | | | The steps are on | | | | |
| LED No. | off | 10 | off | 10 | | | the middle stage. | | | | |
| Step sequence | 53 | 54 | 55 | 56 | 57 | 58 | 59 | 60 | 61 | 62 | 63 |
| LED No. | 11 | 13 | 15 | 11 | 11 | 12 | 12 | 13 | 13 | 14 | 12 |
| LED No. | off | off | off | off | 15 | off | 14 | off | 15 | off | 14 |
| Step sequence | 64 | 65 | 66 | 67 | 68 | 69 | 70 | 71 | 72 | 73 | 74 |
| LED No. | 15 | 13 | 11 | 11 | 12 | 12 | 11 | 14 | 11 | 15 | 12 |
| LED No. | off | 15 | off | 14 | off | 15 | 13 | off | 14 | off | 15 |
| Step sequence | 75 | 76 | 77 | 78 | | | | | | | |
| LED No. | 11 | 11 | 13 | 11 | | | The steps are on | | | | |
| LED No. | off | 15 | off | 15 | | | the lower stage. | | | | |

The above blinking pattern modes are basically for training the movements of eye balls and the focal point adjustment performance. The point of sight of the eye balls is naturally moved according to the blinking of the LEDs 18. Therefore, the training can be carried out without requiring any concentration and will. The lighting pattern takes effect in the movement training of ocular movement muscles by the movements of the positions of lighting LEDs. Furthermore, at the same time, by providing a plurality of the positions of LEDs which are lit simultaneously, the focal point adjustment performance of eyes can be trained by adjusting the focal point in such states that eyes are caused to look at a short distance object in a case where the distance between the lighting positions is short and at a long distance object in a case where the distance between the lighting positions is long.

Here, as the LEDs 18 are hidden by the half mirror plate 9, an external light is reflected on the surface of the half mirror plate 9 in a case where it is assumed that the external light comes in with the mask 2 not adhered closely to the face, and the LEDs 18 which are not lit can not be seen. Therefore, there is no fear for the trainee's attention to be obstructed. Usually, the mask 2 is adhered closely to the face by the supporting band 3 and the apparatus is used for the training with no external light permitted to come in. Accordingly, the inside of the apparatus while being worn is completely dark, and the trainee can not see anything including the LEDs 18. It is possible for the trainee to concentrate more the will easily. It is preferable that the light intensity of the LEDs 18 is set to to be as bright as possible in such a range as does not damage the eyes. Especially, it is preferable that the matching between the light intensity thereof and the light penetration ratio of the half mirror plate is secured so that the lighting of the LEDs 18 can be seen without fail through the half mirror plate 9 even when any external light comes in.

As shown in FIG. 8, the incandescent lamp 15 is accommodated in the swelled portion 1*c* at the upper portion of the front casing 1*a* together with the lamp case 16 to accommodate the lamp 15, and is arranged at the upper front part of the half mirror plate 9. A white dispersion plate 24 made of synthetic resin is attached downwards of the incandescent lamp 15, so that the light issued from the incandescent lamp 15 can be effectively dispersed. At least the rearward radiated light of that issued from the incandescent lamp 15 is brought to the trainee's eyes by being reflected by the half mirror plate 9. The incandescent lamp 15 is for the sake of the light and shade training. In the light and shade mode for the light and shade training, the incandescent lamp 15 is designed to be turned on at an appointed interval. The light and shade mode with the incandescent lamp 15 is to train the opening and closing of the irises of a trainee. For example, the opening or closing step is four seconds, and is repeated alternately twenty-one times.

Figure 14:
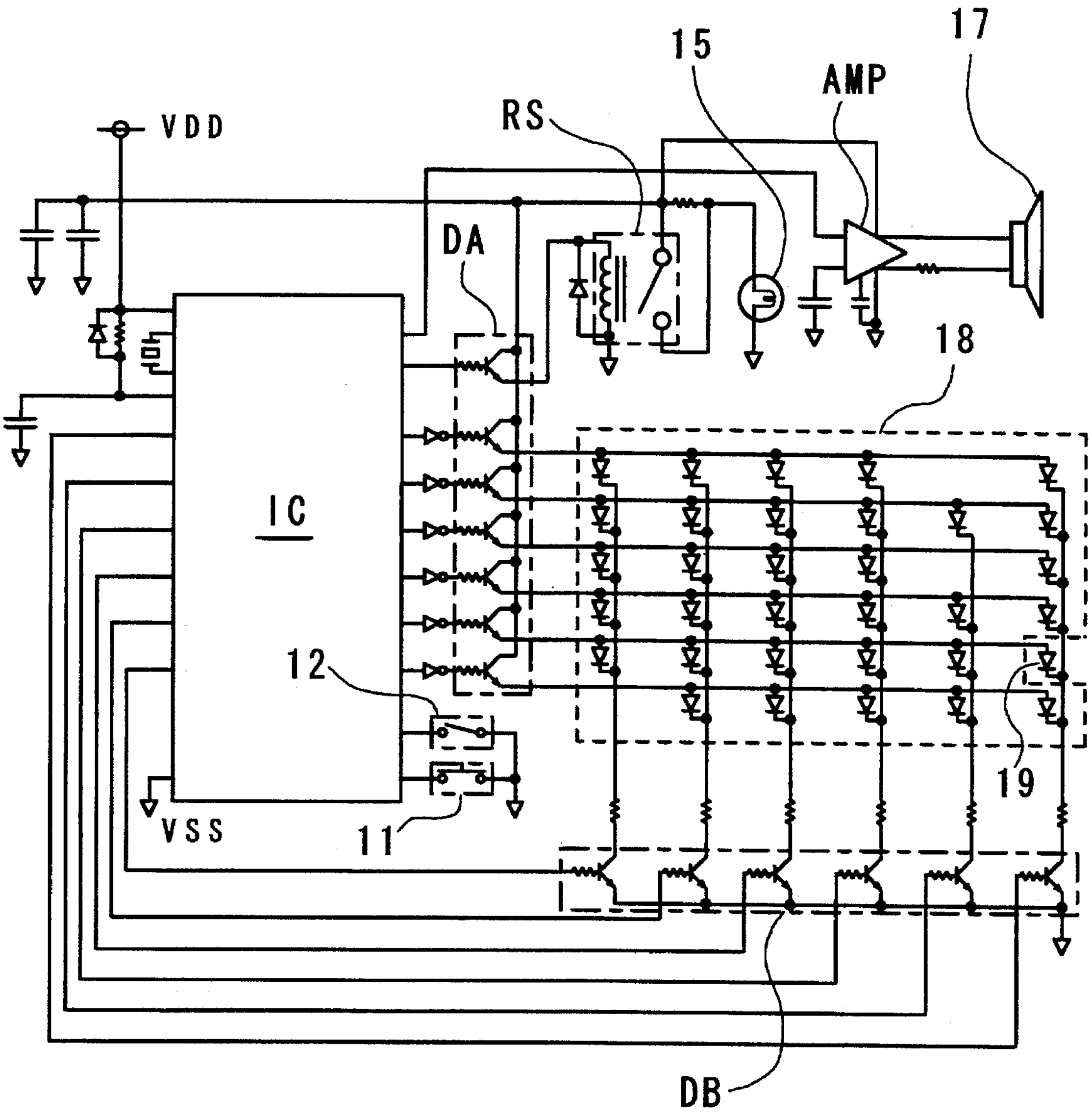
FIG. 14 is a circuit diagram showing the configuration of control circuits of the preferred embodiment.

FIG. 14 is a circuit diagram of the control circuit 7*a* of the preferred embodiment. The control circuit 7*a* comprises a control integrated circuit IC, drive circuits DA, DB to drive the respective LEDs, incandescent lamp 19 and LED 19 by receiving LED control signals which are outputted from the integrated circuit IC, an electromagnetic relay which is opened and closed by the drive signals coming from the drive circuit DA and yields the blinking actions of the incandescent lamp 15, and output amplifier AMP to output sound signals to the speaker 17. The drive circuits DA, DB carry out static drive of the respective LEDs connected in matrix. Power supply lines (VDD and VSS) of 6V which is supplied from the power source is connected to the integrated circuit IC, incandescent lamp 15 and output amplifier AMP. Furthermore, the start switch 11 and sound switch 12 are connected to the integrated circuit IC.

A plurality of kinds of lighting pattern modes and light/shade modes are stored in the integrated circuit IC in compliance with an appointed program in advance. As the power is supplied, the LED 19 is lit. By opening the start switch 11 in this state, the blinking pattern modes and light/shade modes are executed in an appointed sequence by closing the start switch. For example, Since the start switch is closed, the blinking patter mode 1, blinking pattern mode 2, light and shade mode and blinking pattern mode 3 are executed in this order. When the sound switch 12 is closed, necessary explanation (for example, an expression "Close your eyes" before commencing the light and shade mode) is sounded through the speaker 12 through the output amplifier AMP based on the sound data pre-recorded in the integrated circuit IC. While the sound switch 12 is opened, the above program progresses without any expression shown above.

As described above, in the preferred embodiment, a plurality of LEDs 18 are arranged behind the half mirror plate 9. By lighting them in compliance with appointed patterns, it is possible to carry out various kinds of training such as visual acuity, especially, the ocular movement muscles, ciliary body, that is, the training (direction and far/near training) for the purpose of sight point movements and focal point adjustment. Here, as the respective LEDs 18 are arranged behind the half mirror plate 9, a trainee can not see any one of the LEDs which are not lit, regardless of the existence of external light. The trainee is obliged to concentrate his sight on only the LEDs which are lit and is caused to visually recognize them. Thereby, the effect of training will be able to be increased. Furthermore, the half mirror plate 9 also takes effect in causing the trainee to observe the trainee's eyes in a case where the trainee will wear the preferred embodiment under such conditions that the trainee consciously brings external light into the casing thereof.

Still furthermore, it is possible to carry out the light and shade training by the blinking of the incandescent lamp 15. Namely, the irises training is able to be carried out. In this case, as the light of the incandescent lamp 15 is reflected from the half mirror plate 9, the light of the incandescent lamp 15 is caused to be effectively irradiated onto the eyes of a trainee, thereby causing the power consumption of the incandescent lamp to be decreased and the size thereof to be made more compact. Furthermore, in a case where the incandescent lamp is arranged at the circumference forward of the half mirror plate 9, it is attempted that the apparatus is made thin, and simultaneously the light reflected from the half mirror plate 9 will be able to be irradiated onto the eyes of a trainee. As the light of the incandescent lamp 15 penetrates the white dispersion plate 24, the light is effectively dispersed with the necessary light intensity secured, thereby preventing the eyes of a trainee from being damaged. It is preferable that the light and shade training is performed with the eyes closed.

The preferred embodiment is composed so that the casing body 1 thereof is formed to be like an eye mask to cover up both eyes and the casing body 1 is fixed on the head with a supporting band 3. Therefore, there will not be caused such a problem as the training efficiency is lowered due to a trainee moving the face unconsciously when the lighting position of the LEDs 18 moves by turns according to the respective patterns. Furthermore, as the mask 2 is adhered closely to the face of a trainee, it is possible to intercept the invasion of almost all external light, and the concentration in the training will be much more increased.

Furthermore, as, in the casing body 1, the incandescent lamp 15 is arranged at the circumference of the front side, that is, above the front side in the preferred embodiment, the circuit substrate 7 for accommodating the control circuit 7*a*, the supporting plate 8 for supporting LEDs 18 and the rear side thereof for accommodating the half mirror plate 9 can be entirely formed to be thin, and the entire apparatus can be made compact in size. Therefore, the portability thereof is very high, and the apparatus will not give a trainee any sense of congruity in use. Here, as the light of the incandescent lamp 15 is designed to be efficiently irradiated onto both eyes of a trainee by the half mirror plate 9, it is possible to suppress the power consumption of the incandescent lamp with necessary light intensity secured and to make the lamp compact. Such an effect will be brought as it is much easier to made the entire apparatus compact.

As explained above, with the invention as at least some of small light emitting members are caused to be lit one after another by a light emitting control portion, it is possible to carry out the training of ocular movement muscles and ciliary body by changing the sight point according to the movements of small light emitting members which are lit.

Furthermore, as a half mirror plate is attached to the front side of the small light emitting members, the light of the small light emitting members arranged therebehind is caused to penetrate frontwards. On the other hand, the small light emitting members which are not lit at this moment and other background structures can not be visually recognized. Only the small light emitting members which are lit can be recognized. Therefore, the concentration will not be disturbed, and it is possible to execute the training in compliance with the lighting pattern modes, that it, the direction and far/near training.

Still furthermore, as an illuminating lamp is provided at the circumferential position forwards of the half mirror plate, the apparatus is configured to be made thin, and simultaneously, it is possible to execute the light and shade training by causing the illuminating lamp to blink. Here, as a part of the illuminating lamp light, especially the light irradiated rearwards, can be reflected by the half mirror plate, the illuminating lamp light can be efficiently utilized for the training. That is, it is possible to attempt to suppress the power consumption of the illuminating lamp with the light intensity necessary for effective training secured, and to make the size thereof compact.

What is claimed is:

1. A visual acuity recuperation training apparatus for the recuperation of visual acuity by training of the ocular movement muscles, the ciliary body, and/or the irises, comprising:

(a) a plurality of small light emitting elements dispersed and arranged on a panel plane in the up and down and left and right directions, (b) and a light emitting elements control section configured so that it is possible to blink at least some of the small light emitting elements with the blinking pattern modes in which they are lit one after another with appointed patterns, said blinking pattern modes being configured with a first blinking pattern for direction training in which one of the small light emitting elements is lit at a time and the small light emitting element to be lit is changed one after another on an appointed interval, and a second blinking pattern for the far and near training which two of the small light emitting elements are lit at a time and the distance between said two small light emitting elements to be lit is changed one after another on an appointed interval.

2. A visual acuity recuperation training apparatus set forth in claim 1, wherein a light and shade light-emitting element having a larger light emitting area and larger light intensity than the small light emitting elements is arranged on the panel plane, and the light emitting elements control section is configured so that it is possible to cause the light and shade light-emitting element to blink at an appointed interval with an appointed light and shade mode.

3. A visual acuity recuperation training apparatus set forth in claim 2, wherein the light and shade light-emitting element is composed so that it irradiates white dispersed light frontwards of the apparatus.

4. A visual acuity recuperation training apparatus set forth in claim 1, wherein the panel plane and the small light emitting elements while they are off are formed to be of the same color.

5. A visual acuity recuperation training apparatus for the recuperation of visual acuity by training of the ocular movement muscles, the ciliary body, and/or the irises, comprising;

(a) a plurality of small light emitting elements dispersed and arranged roughly on a plane, a half mirror plate arranged roughly parallel to the front side of the arrangement plane of the small light emitting elements, (b) and a light emitting elements control section configured so that it is possible to cause at least some of the small light emitting elements to blink with the blinking pattern modes in which they are lit one after another with appointed patterns, said blinking pattern modes being configured with a first blinking pattern for direction training in which one of the small light emitting elements is lit at a time and the small light emitting element to be lit is changed one after another on an appointed interval, and a second blinking pattern for the far and near training in which two of the small light emitting elements are lit at a time and the distance between said two small light emitting elements to be lit is changed one after another on an appointed interval.

6. A visual acuity recuperation training apparatus set forth in claim 5, wherein an illuminating lamp is provided at the circumferential position forwards of the half mirror plate, and the light emitting elements control section is composed so that it is possible to blink the illuminating lamp with an appointed light and shade mode at an appointed interval.

7. A visual acuity recuperation training apparatus set forth in claim 5, wherein the illuminating lamp irradiates white dispersed light.

8. A visual acuity recuperation training apparatus set forth in claim 5, wherein the casing body is formed to cover up at least both eyes of the face and is provided with a supporting member to hold the casing body on the face.

* * * * *